United States Patent [19]
Shah et al.

[11] Patent Number: 5,410,536
[45] Date of Patent: Apr. 25, 1995

[54] METHOD OF ERROR RECOVERY IN A DATA COMMUNICATION SYSTEM

[75] Inventors: Vinay V. Shah, Eastleigh; Ian D. Judd; Bernard J. Grainger, both of Winchester; Gordon J. Cockburn, Romsey, all of United Kingdom

[73] Assignee: International Business Machines Corporation, Armonk, N.Y.

[21] Appl. No.: 916,009
[22] PCT Filed: Feb. 19, 1991
[86] PCT No.: PCT/GB91/00257
 § 371 Date: Sep. 25, 1992
 § 102(e) Date: Sep. 25, 1992
[87] PCT Pub. No.: WO92/10893
 PCT Pub. Date: Jun. 25, 1992

[30] Foreign Application Priority Data
Dec. 4, 1990 [GB] United Kingdom ................ 9026338

[51] Int. Cl.6 ..................... H04L 1/12; H04L 1/16
[52] U.S. Cl. ..................... 370/13; 370/94.1; 371/33
[58] Field of Search ............ 370/13, 17, 80, 60.1, 370/94.1, 94.2; 371/32, 33, 35

[56] References Cited
U.S. PATENT DOCUMENTS 4,422,171 12/1983 Wortley et al. .................. 371/32
4,439,859 3/1984 Donnan ........................... 371/32
4,601,035 7/1986 Marzec et al. ................... 371/32
5,010,553 4/1991 Scheller et al. ................. 371/32

FOREIGN PATENT DOCUMENTS
0214020 3/1987 European Pat. Off. .
8502041 5/1985 WIPO .

Primary Examiner—Wellington Chin
Attorney, Agent, or Firm—Roy W. Truelson; Matthew J. Bussan

[57] ABSTRACT

Described is a method of error recovery in a data communication system of the kind comprising two nodes connected by a serial link and wherein data is transmitted between the nodes in the form of packets of a predefined format. Each node receives data over an inbound line and transmits data over an outbound line. When an error is detected, both nodes enter a link check state, invoke a Link Error Recovery Procedure (ERP) and exchange status by means of Link Resets. Error recovery is performed separately for each line. Each node is responsible for recovering packets that were lost on its outbound line. In normal operation of the link, the transmitter does not reuse a packet buffer until it has received a response from the connected node indicating that the packet was correctly received. Therefore when an error occurs, the affected packets are still available for retransmission.

10 Claims, 9 Drawing Sheets

| LOCAL NODE | O/B LINE | I/B LINE | REMOTE NODE |
|---|---|---|---|
| | ———> | <——— | |
| TP=0, RP=0 | | | TP=0, RP=0 |
| TSN=0, RSN=0 | | | TSN=0, RSN=0 |
| Tx packet 0 | Packet 0 | | |
| | " | RR response | Tx RR response |
| | " | | |
| TSN=1, TP=1 | " | | RSN=1 |
| Tx packet 1 | Packet 1 | Illegal frame | Tx ACK response |
| Illegal frame | " | RR response | Tx RR response |
| ACK time-out | " | | |
| Enter check state | " | | |
| TSN=2, TP=2 | " | | RSN=2 |
| | | ACK response | Tx ACK response |
| Invoke Line ERP | | | |
| Wait for Tx complete | | | |
| Assemble LSB | | | |
| Tx Link Reset | Link Reset | | |
| Wait to Rx Link Reset | | RR response | Tx RR response |
| " | | ACK response | Tx ACK response |
| | | | Enter check state |
| " | | | |
| " | | | Invoke Link ERP |
| " | | | Wait for Tx complete |
| " | | | Assemble LSB |
| " | | Link reset | Tx Link Reset |
| Tx RR response | RR response | | Q=0, P=0, TP=0 |
| Tx ACK response | ACK response | | Discard 0 packets |
| Q=2, P=0, TP=2 | | | RP=0 |
| Discard 2 packets | | | |
| RP=2 | | | |
| Enter disabled state | Zeros | Zeros | Enter disabled state |
| RSN=TSN=0 | " | " | RSN=TSN=0 |
| Wait for no Rx frames | " | " | Wait for no Rx frames |
| | " | " | |
| Enter enabled state | | | Enter enabled state |
| Wait to Rx FLAG | | | Wait to Rx FLAG |
| Enter ready state | | | Enter ready state |
| Tx packet 2 | Packet 2 | | |
| | " | RR response | Tx RR response |
| | " | | |
| | " | | |
| TSN=1, TP=3 | " | | RSN=1 |
| RP=3 | | ACK response | Tx ACK response |

FIG. 7

METHOD OF ERROR RECOVERY IN A DATA COMMUNICATION SYSTEM

TECHNICAL FIELD OF THE INVENTION

This invention relates to the field of data communication and more particularly to a method for recovering from errors occurring during transmission of data between nodes in a digital system.

BACKGROUND OF THE INVENTION

Data communication systems and the elements making up data communication systems involve the electronic transmission of data over a link from one node (e.g computer or terminal) of the system to another. To ensure communication in an orderly fashion over the data link, a uniform method of sending and receiving information is required. This uniformity is achieved by means of a protocol (set of rules) used for the management of a data link in the communication system. Protocols are used to perform such functions as establishing the conversation between two nodes in the communication system, identifying time sender and receiver, acknowledging received information and node initialisation. The exact procedure and function performed depends on the protocol used. Data link protocols may be classified in two categories; bit oriented protocols (BOP) and byte oriented protocols.

Prior bit oriented protocols include the Synchronous Data Link Control (SDLC) protocol which was introduced by IBM in 1973 and the High Level Data Link Control (HDLC) protocol. All communications in a BOP system are in the form of frames of uniform format which comprise a number of fields each having a definite location and precise meaning. In HDLC a frame commonly starts with an eight bit flag sequence which is followed by ADDRESS and CONTROL fields after which may follow an INFORMATION field (depending on the function of the frame). The INFORMATION field is followed by a FRAME CHECK SEQUENCE field and the end of the frame is delimited by another flag sequence. The Address and Control fields in HDLC each comprise a single octet of bits. The information field may contain a variable number of bits, in the form of an integral number of octets, up to a predefined limit. The FCS field commonly comprises a pair of octets.

In HDLC, the CONTROL field defines the function of the frame. There are three basic types: Information, Supervisory and Unnumbered which are referred to as I-frames, S-frames and U-frames. The I-frame is used to provide for information transfer across the link and contains an INFORMATION field. The S-frame is used to perform supervisory functions on the link and may be used to acknowledge I-frames, or to request retransmission of frames. The U-frame is used particularly in error recovery.

HDLC is often employed in systems wherein data communication is over relatively long distances where there will be a number of data frames on the link at any one time. The method of acknowledgement that data has been received has to be capable of detecting the incorrect transmission of any one of these data frames. An implied acknowledgement technique is used which enables frame acknowledgement information to be included within an I-frame. This is accomplished by assigning identification numbers, called sequence numbers, to received and transmitted frames. These numbers contain information pertaining to the number of frames transmitted and received by the individual node. By checking these numbers, the node can compare the number of received frames with the number of transmitted frames and take the appropriate error recovery action if a discrepancy exists. Although the packet sequence numbers used in the described implied acknowledgment technique may be included within an I-frame, if information frames are not being sent by the node receiving the data frame to be acknowledged, then it is necessary to include the sequence number information in a separate S-frame. Details of one subset of HDLC can be found in 'X25 explained' by R J Deasington, published by Ellis Horwood Limited.

Errors occurring during data transmission between nodes are corrected in different ways depending on the type of error detected. If the receiver receives a frame which is out of sequence, an S-frame with a reject (REJ) control field is sent by the receiver to the transmitter. This requests retransmission of I-frames starting at the one after the last frame that was correctly received. If an error is detected which cannot be recovered by the retransmission of identical frames then the node detecting the error sends a U-frame which includes a copy of the control field of the frame which has been rejected and an indication of the type of error encountered.

In bit oriented protocols, it is not necessary to operate in a send and hold mode whereby the transmitting node has to wait for acknowledgement that a frame has been received before transmitting a subsequent frame. Thus Bit oriented protocols are operable in full duplex mode (two way simultaneous communication). BOP systems may of course be operated in half duplex mode (two way alternate communication) though in half duplex mode, the advantages inherent in the protocol are not used.

One type of byte oriented protocol is BISYNC, in which information is transmitted in blocks consisting of one or two sync characters, an address, control characters, an information field and an error checking code. Special block control characters are used to manage the flow of information over the link. In BISYNC it is necessary to ensure that the information field does not contain a bit sequence which corresponds to one of the control characters otherwise that bit sequence will be incorrectly interpreted by the system as a control character. BISYNC is an example of a send and hold protocol in which the transmitting node has to receive acknowledgement of a first block of data before it can begin sending a second block. Accordingly, BISYNC in its basic form is not able to operate in full duplex mode.

DISCLOSURE OF THE INVENTION

The invention provides, in one aspect, an error recovery method for use in a data communication system of the kind comprising two nodes connected by a serial link, data being transferred between the nodes in packets of a predefined format, in which method, each node monitors the system for errors and, if an error is detected, by one node, it sends a message to the other node, the message including a sequence number indicative of the last packet received by said one node and on receipt of said message the other node sends a message to said one node including a sequence number indicative of the last packet received by that node, each ndoe determining from the message from the other node the number of packets, if any, that were not correctly received by the other node and retransmitting the missing packets.

In a preferred method, when the first node detects an error it enters a link check state and invokes a link error recovery procedure (ERP) which causes the first node to build a link status byte indicating the type of error detected and to send the link status byte to the second node and wherein the second node on receipt of the link status byte identifies if the indicated error is of the type which may be recovered by retransmission of one or more packets of data and if so the second node transmits said packets to the first node.

Thus in the error recovery method of the present invention, the error recovery actions are symmetric in that each node is made aware of the other node's status during the Link Error Recovery procedure. Exchange of this status between the nodes identifies which packets have to be re-transmitted.

It is necessary at this stage to clarify the meaning of the various terms used in the present invention and their relation to the terminology employed in the description of the prior art. The term 'packet' as used in the present invention is essentially equivalent to the term 'frame' as used in the prior art description of the HDLC protocol. In addition the term 'frame' used in the present invention is essentially equivalent to the term 'octet' as used in the description of HDLC.

The recovery of many types of error is transparent to the application. In the case of a link error i.e. when a packet sent by a node is not received correctly by the receiving node and is therefore not acknowledged by the receiving node, the data remains in a transmit buffer in the transmitting node and is available for re-transmission. However if the detected error is of a type, e.g. hardware error, which is probably not recoverable by packet retransmission, then the application which is communicating via the link is alerted. The application then takes the necessary action to recover from the error.

According to another aspect of the invention, there is provided a data communication system including two nodes connected by a serial link over which data is transferred between the nodes in packets of a predefined format, error detection means in each node for detecting errors in the system, and transmission error recovery means in at least one node responsive either to detection of an error by the error detection means of that node to cause that node to send an error message to the other node including a sequence number indicative of the last packet received by said at least one node, or to receipt of an error message from the other node to cause said at least one node to send its error message to the other node, each node being arranged to determine from the error message from the other node the number of packets, if any, that were not correctly received by the other node and to retransmit the missing packets.

The ERP used in the present invention can be implemented in software, or being systematic, in hardware if performance is critical.

A preferred embodiment of the invention will now be described by way of example only with reference to the accompanying drawings.

BRIEF DESCRIPTION OF THE INVENTION

FIG. 7 is a flow diagram showing the steps involved in recovering from a corrupted ACK response;

DETAILED DESCRIPTION OF THE INVENTION

A glossary of terms used in the following description can be found in attached Table I.

Figure 1:
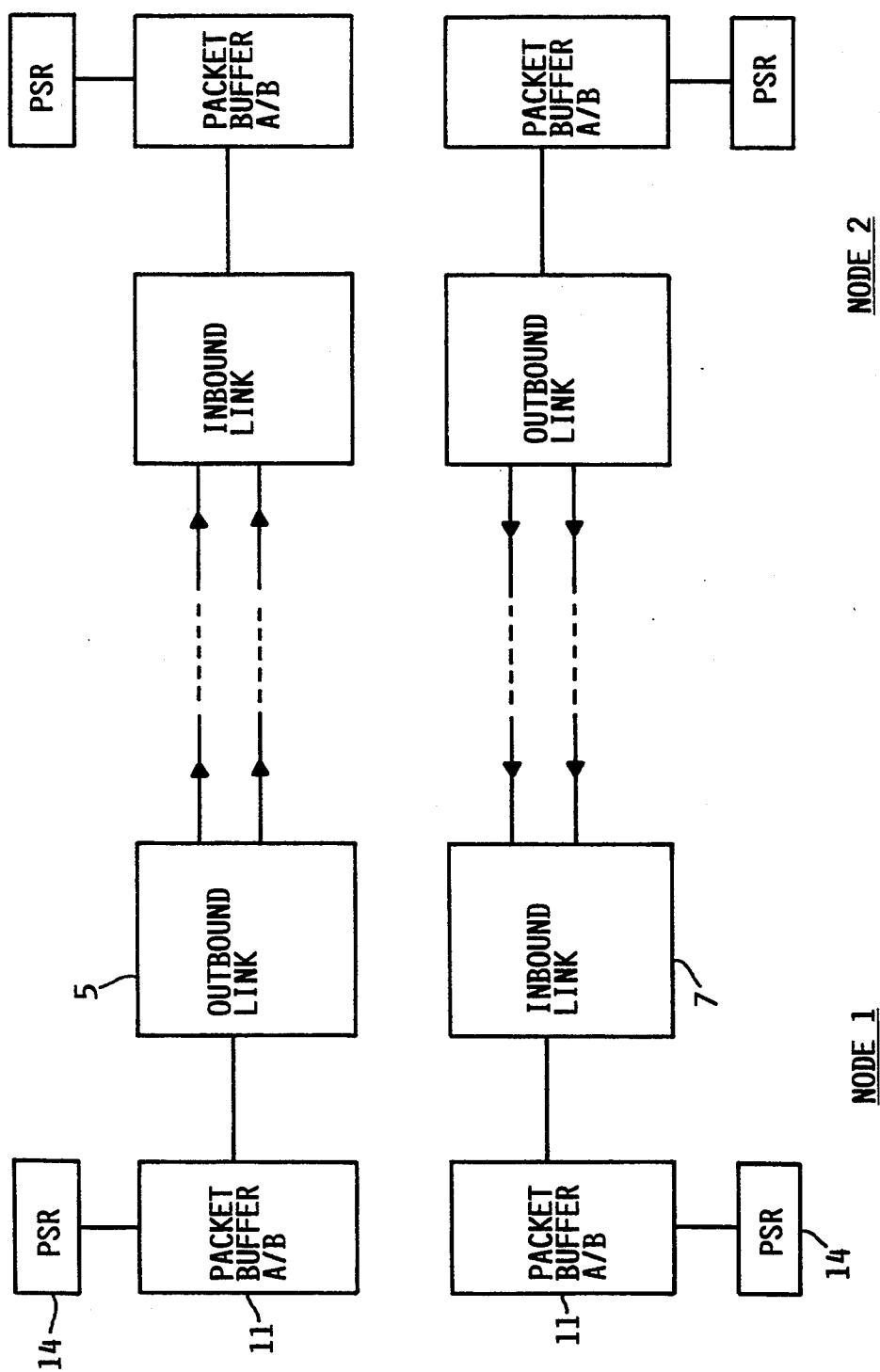
FIG. 1 shows a schematic diagram of the main components of a node to node data link configuration according to the present invention.

FIG. 1 shows two nodes (node 1 and node 2) each of which has an associated inbound 7 and outbound 5 link. Each link controls the transmission or receipt of data to and from the connected node. Data to be transmitted or that has been received is held in outbound and inbound packet buffers 11 respectively. Each packet buffer has associated with it a packet status register 14 in which some of the information required for the transmission or receipt of data is held.

Data is transmitted between the nodes in the form of packets of a predefined format, The control of the flow of the data packets is managed by means of control frames. Details of the data packets and control frames will now be described.

There are two basic types of frame employed: DATA frames and PROTOCOL frames. In the embodiment described herein there are 256 data frames and 4 protocol frames. The protocol frames are used to delimit packets and to provide flow control.

Figure 5:
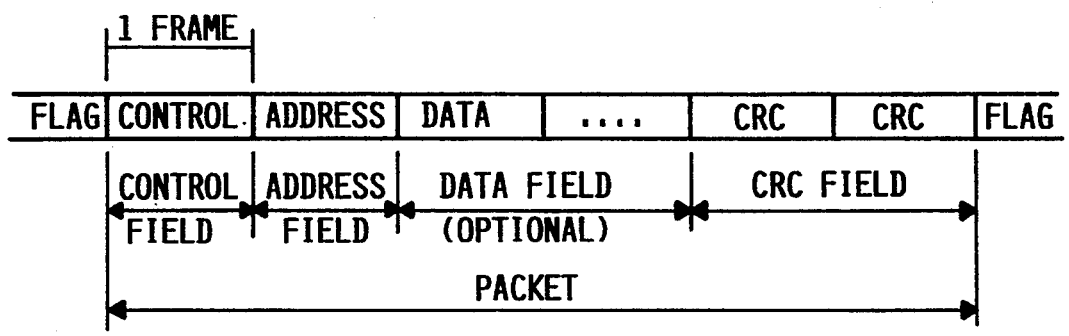
FIG. 5 shows the format of a data packet by means of which data is transmitted.
Figure 6:
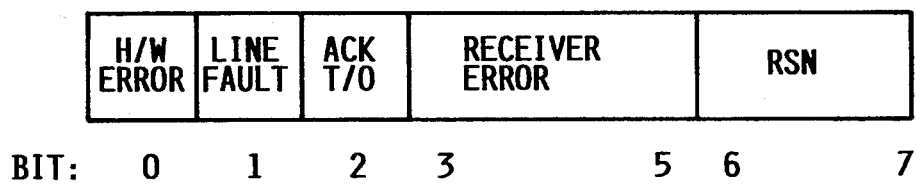
FIG. 6 shows the format of the link status byte employed in the present invention.

FIG. 5 shows the packet format which is used for the transmission of data over the link, A packet consists of a sequence of at least 4 data frames that is delimited at both ends by a FLAG frame (described below). A packet is divided into a sequence of 3 or 4 fields as follows:

Control field. (1 frame, always present.)
Address field. (1 frame, always present.)
Data field. (Variable length, optionally present.)
CRC field. (2 frames, always present.)

The shortest possible packet, with no data field, contains 4 data frames. If a node receives a packet containing less than 4 frames then it will indicate a protocol error.

CONTROL FIELD: The control field is the first data frame following a FLAG. When received by the receiving node and after decoding (more detail of which is given later), the resulting byte is interpreted as follows:

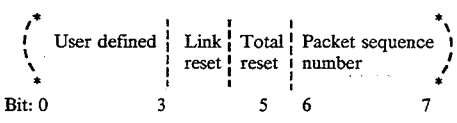

User Defined: these are spare bits and may be used for any purpose that the using system requires.

Link Reset & Total Reset: These bits are used in the error recovery procedure which is associated with the communication method described herein. Some details of the error recovery procedure are described in the present application but more specific detail of the associated error recovery procedure can be found in a concurrently filed application entitled 'Method of Error Recovery' filed in the same name as the present application.

Packet Sequence No: These 2 bits are used to protect against lost or duplicate packets. They are incremented modulo 4 by the transmitter in each successive packet and checked by the receiver.

ADDRESS FIELD: This is a single data frame that immediately follows the control field. It normally contains the encoded destination address of the packet within the remote node.

DATA FIELD: The data field is optional. If present it consists of a variable number of data frames that follow the address field. The content of the data field is controlled entirely by the application and it is of no relevance to the architecture of the link. The maximum length of the data field is implementation dependent and it depends on (i) the size of the available packet buffers, (ii) the sustained data rate that is required and (iii) the acceptable error rate given the system environment and the defined CRC polynomial.

Some implementations may have further restrictions, eg. the length of the data field must be an even number of frames. In such an implementation, if a node receives a packet with an incorrect length for the data field then it rejects the packet.

CRC FIELD: The CRC field consists of 2 data frames that immediately precede the trailing FLAG. It is used to check the control, address and data fields. The destination does not regard any of the fields as valid until the CRC field has been received and checked by the receiver.

For each packet of data, the CRC field is calculated by the outbound CRC generator, in a 16 bit register, using the following polynomial:

$$X^{16}+X^{15}+X^2+1.$$

The CRC register is preset to all ones at the start of each packet.

The inbound CRC accumulator in the inbound serial link decodes the CRC field and checks it using the same polynomial as described above. The CRC register is preset to all ones at the start of each packet and accumulated over the control, address and data fields. At the end of accumulation, provided that the incoming packet was received without error, the CRC register in the inbound accumulator should contain all zeros.

One type of protocol frame defined in the communication method of the present invention is a FLAG frame which is used to delimit a packet. The transition from a FLAG frame to a data frame marks the start of packet, and the transition from a data frame to a FLAG frame marks the end of a packet. These will be referred to later in the description as the leading FLAG and the trailing FLAG respectively.

To minimise overheads a trailing FLAG call also be the leading FLAG of the next packet. Thus consecutive packets are separated by a minimum of one FLAG. The bit pattern for the FLAG frame has been chosen such that it does not occur at any bit position in an arbitrary sequence of any other valid frames. An example bit pattern for this and other types of protocol frame is described below. The FLAG frame also serves the additional purpose of providing frame synchronisation. In addition, FLAG frames are sent when the link is idle in order to maintain synchronisation at the receiving end of the link.

The communication method and system of the present invention provide the means for transmitting data in the form of the above described packets from a source to a destination node. To implement the necessary flow control, the destination sends the source two responses for each packet:

ACKNOWLEDGEMENT A pair of consecutive ACK protocol frames

RECEIVER READY A pair of consecutive RR protocol frames.

The control frames are preferably used in pairs to protect the responses from being manufactured by transmission errors. A node only acts on a response when it has received both frames of the pair without any other intervening frames.

In full duplex operation a node may wish to send a response for a received packet whilst it is in the middle of transmitting another packet. In this case the transmitter gives priority to the response and interleaves it within the packet. This scheme miniraises latency and it allows the maximum link thoughput to be achieved with only 2 packet buffers in each transmitter and each receiver.

Since responses consist of control frames the receiver can easily separate them from the data frames that make up a packet. The CRC field for a packet does NOT include any interleaved response frames.

ACKNOWLEDGEMENTS: The communication method of the present invention requires a node to acknowledge every valid received packet. A packet is valid if it does not contain any of the 'receiver errors' listed in the link status byte. The destination transmits an ACK response when it receives a valid packet. When the source receives the ACK response, the portion of the outbound data buffer which contained the information making up the acknowledged packet may be cleared ready for the input of new data to be transmitted.

Each node has two associated conditions, waiting for ACK and 'ACK pending'. How these conditions control acknowledgements is next described with reference to FIG. 4:

1. When a node enters the 'ready' state (the possible states of the link are described in more detail below) it clears 'waiting for ACK' and 'ACK pending'.

2. A node sets 'waiting for ACK' 2 frame periods after it finishes transmitting the trailing FLAG of any packet. A node resets 'waiting for ACK' when it receives an ACK response. The corresponding outbound packet buffer may then be deallocated and filled by another packet.

If a node does not receive the first ACK of the response within a predefined time (e.g. 10 micro seconds) after setting 'waiting for ACK' for a packet then it recognises an ACK time out.

If a node is still 'waiting for ACK' widen it finishes transmitting the CRC field of the next packet then it does not transmit the trailing FLAG. Instead it sends NUL frames until either the ACK response is received or an ACK time out occurs. If an ACK time out does occur in this state then the node must send an illegal frame followed by FLAG's. The illegal frame aborts the packet and ensures that it is rejected by the remote node.

This protocol guarantees that the transmitter can always associate each ACK response unambiguously with the corresponding packet independently of propagation delays, the transmission speed and the packet length.

If a node receives an ACK control frame when it is not 'waiting for ACK' or it receives only a single ACK frame, then it recognises a protocol error.

3. A node sets 'ACK pending' immediately when it receives the trailing FLAG of a valid packet when the node is in the 'ready' state.

4. When 'ACK pending' is set the node must transmit an ACK response as soon as possible, However if an RR response is in progress then it must be completed first. 'ACK pending' is reset when the ACK response has been transmitted.

PACING

Pacing ensures that the transmitter does not overrun the available buffers in the receiver. The unit of pacing is a packet. The method of communication of the present invention requires a receiver to have only one buffer, although at least 2 buffers are generally required to achieve continuous (full duplex) operation of the link.

Each node has two conditions that control pacing, 'waiting for RR' and 'RR pending':

1. When a node enters the 'ready' state it sets 'waiting for RR' and 'RR pending'. Consequently it will send an RR response immediately and it will not send any packets until it receives an RR response.

2. A node may only start to send a packet when either of the following conditions is satisfied:

The node is in the 'ready' state and it is not 'waiting for RR'.

The node is in the 'check' state and the packet control field will specify Link Reset or Total Reset. 'Waiting for RR' is set when a node transmits the control field of any packet and reset when it receives an RR response.

3. When all of the following conditions are satisfied a node transmits an RR response immediately after the cur rent frame:

The node is in the 'ready' state and 'RR pending' is set.

At least one inbound buffer is available to receive a packet in addition to the packet currently being received, if any.

The node is not currently transmitting an ACK response and 'ACK pending' is not set.

'RR pending' is set when a node receives the control field of any packet, including invalid packets. It is reset when the node transmits an RR response.

PACKET SEQUENCE NUMBERS are employed to protect against packets being lost or duplicated by a transmission error. For example, if a FLAG is corrupted then two packets may be merged into one. A packet could be duplicated if a transmission error corrupts an ACK response. To guard against this the Link ERP needs to know whether the corresponding packet has actually been received by the destination.

The control field of each packet contains a 2 bit Packet Sequence Number (PSN). In normal operation the PSN increments modulo 4 in each successive packet.

Each node maintains a 2 bit Transmit Sequence Number (TSN) and it copies this into the PSN of each packet sent. The TSN is reset to '00'B in the 'disabled' state and it is incremented modulo 4 for each packet transmitted, regardless of any response received.

Each node also maintains a 2 bit Receive Sequence Number (RSN). This is reset to '00'B in the 'disabled state' and it is incremented modulo 4 only when the receiver accepts a packet, ie. when it returns an ACK response. However the RSN must not be incremented by Link Resets. When a packet is received the hardware checks the PSN against the RSN as follows:

If PSN=RSN then the sequence is correct and the receiver has received the packet it was expecting. Providing that there is no other error then the packet is accepted and an ACK response is returned.

If PSN is not equal to RSN and the packet does not specify Link Reset or Total Reset then one or more packets have been lost. The current packet is not acknowledged and the node recognises a sequence error.

NB. The receiver ignores the PSN in a link Reset or Total Reset packet.

NUL FRAMES

The node transmitter is permitted to insert NUL protocol frames within a packet anywhere after the first data frame. The receiver ignores NUL frames by discarding them. NUL frames are not included in the calculation of the CRC field. This facility is useful in the following cases:

(i) If the transmitter has started to send a packet but the data needed to complete the packet is temporarily unavailable.

(ii) If the transmitter is still waiting for an ACK response when it is ready to send the trailing FLAG of the next packet.

In order to guarantee frame synchronisation NUL's are not permitted when the link is idle. If the receiver detects a NUL frame and it has not decoded a data frame since it received the last FLAG then it indicates a protocol error.

Packets may be aborted if a node detects an internal hardware error while it is transmitting a packet. This is achieved by inserting an illegal frame anywhere before the trailing FLAG.

Each node must provide at least one buffer for received packets. The buffer must be large enough to accommodate the longest packet that is defined. The buffer is needed to allow the CRC field to be verified before the receiver transfers the data field to the application or acts on the control and address fields. Since the unit of pacing is a packet the buffer is also necessary to prevent overruns.

The source node must retain each packet until it receives the corresponding ACK response. If there is no ACK then the Link ERP may have to retransmit the last one or two packets.

To achieve continuous communication at the full bandwidth of the link it is generally necessary for each node to have, a pair of transmit buffers and a pair of receive buffers. This provides 'A/B' buffering. One buffer of each pair is filled/emptied by the link while the other is emptied/filled by the application.

BUFFER MANAGEMENT

The transmit buffers must be carefully managed to allow correct recovery after an error. It may be necessary to retransmit or discard the last one or two packets that were transmitted just before an error. The link hardware must maintain sufficient status to identify the buffers containing these packets and the order in which they were transmitted. If there are N transmit buffers and the transmitter always accesses them in a cyclic sequence then the following two pointers provide sufficient information:

TRANSMIT POINTER This points to the buffer that is to be transmitted next. It is incremented modulo N each time a trailing FLAG is transmitted.

RETRY POINTER This points to the next buffer to be acknowledged. It is incremented modulo N each time an ACK response is received while 'waiting for ACK' is set. Normally it will follow the transmit pointer closely but when an error occurs it may lag by up to 2.

LINK AVAILABILITY

The link hardware in each node can be in one of four avail ability states:

DISABLED. This is the power on state before the link is made operational.

ENABLED. This is a transient state on the way to making the link operational.

READY. This is the state for normal transmission and reception of packets.

CHECK. This state is entered when an error is detected. The link is not operational until the Link ERP success fully returns the hardware to the 'ready' state.

The current state may be inspected and changed by the node processor to determine the state of the link and to enable and disable it. The hardware state may also change automatically when certain events occur.

DISABLED STATE

In this state the transmitter outputs all zeros and the receiver only responds to a Total Reset. The 'disabled' state is entered automatically after a Local Reset is performed or when a packet specifying Total Reset is received in any of the other states. It is also selected explicitly during the Link ERP.

To guarantee recognition by the remote node, the minimum duration of the 'disabled' state is 5 frame periods.

ENABLED STATE

When a node is ready to begin communications the node processor will first check that the line driver and receiver are not indicating a line fault. It can then explicitly change the hardware state to 'enabled'. In this state the transmitter outputs FLAG's and the receiver listens for a FLAG. When a FLAG is detected the link hardware automatically enters the 'ready' state. The node processor may need to poll to detect this transition or the hardware may provide an interrupt.

READY STATE

This is the state for normal communication.

In order to allow the remote node sufficient time to acquire byte synchronisation, when a node first becomes 'ready' it must transmit at least 5 FLAG's before sending any other frames.

When a node first becomes 'ready' the transmitter will send an RR response when at least 1 inbound packet buffer is available. Similarly it will not send any packets until it has received an RR response.

CHECK STATE

This state is entered automatically when the hardware detects an error or it receives a packet specifying Link Reset. The link is then inoperable until the Link ERP successfully returns the hardware to the 'ready' state. The TRANSITION to the 'check' state invokes the Link ERP.

When the hardware enters the 'check' state the transmitter stops sending data packets after completing the current packet, if any. The transmitter then sends FLAG's continuously, except in the following cases:

If the receiver instructs it to send a response.

If the node processor instructs it to send a Link Reset or a Total Reset.

The receiver discards any incoming packets, except if they specify Link Reset or Total Reset. The receiver also discards RR responses but ACK responses are accepted and actioned.

In the 'check' state the application suspends filling the transmit buffers and emptying the receive buffers. This is to avoid transferring a bad received packet to memory.

WRAP MODE

Independently of the above states a node may be able to operate its link hardware in the 'wrap' mode. This is useful to perform a power on self test (POST) of the local hardware. In the 'wrap' mode the transmitter output is internally connected to the receiver input. This allows half duplex communication using the normal protocol except that packets and their responses share the same line. The link hardware can be fully tested without needing a remote node.

During the 'wrap' mode the out bound line is held at logic zero and the in bound line is ignored.

The 'wrap' mode should be selected with care at any time after the POST's since in some configurations if the node processor hangs it may then be impossible to reset it.

BEGINNING COMMUNICATION

The link hardware is in the 'disabled' state at power on. When a node processor wishes to begin communications it must take the following steps:

1. Check that the line interface circuits are not indicating a line fault. This would indicate that the remote node is not operational or that the cable is disconnected.

2. Put the link hardware into the 'enabled' state. This will cause the transmitter to start sending FLAG's.

3. When FLAG's are received from the remote node the link hardware will automatically change to the 'ready' state.

4. When an RR response is received from the remote node the transmitter resets 'waiting for RR'.

5. A packet can now be transmitted provided that at least 5 FLAG's have been sent since entering the 'ready' state.

ENDING COMMUNICATION

Since the link has to be quiesced first the method of ending communication must be determined by the application. The following example is only intended to illustrate the steps that are necessary:

1. The node that wants to cease communications waits until the remote node has responded to all of its outstanding requests. It then sends a message requesting to shut down the link.

2. The remote node waits until the local node has responded to all of its out standing requests and then it returns a message acknowledging shut down.

3. Both nodes then disable their link hardware.

PHYSICAL MEDIUM

MODULATION

Data is transmitted as a base band digital signal using the NRZI method. A '1' bit is signalled by inverting the state of the line. For a '0' bit the state of the line is un changed.

CLOCKING The Serial Link operates synchronously. The receiver must extract a suitable clock from the transitions in the transmitted data.

ENCODING

Synchronous clocking restricts the bit patterns that the transmitter can use since it is undesirable to have long sequences of zeros. Hence an encoding algorithm is required to convert the arbitrary data that one may wish to send into patterns suitable for transmission.

The serial link as described in the present application uses a 4B/5B code which guarantees that there will never be more than 3 consecutive zeros in the transmitted data stream.

The transmitter encodes every 4 input data bits into one of the 16 5 bit 'data symbols' shown in Figure id 'symbols' unknown. The 5 'control symbols' may also be used freely for link control functions. Some of the 11 'restricted symbols' may also be used if care is taken to avoid violating the clocking requirements.

DATA FRAMES

The following conventions are used in this description:

The bits in an unencoded byte are numbered 0 to 7 from left to right.

The bits in an encoded frame are designated a, b, c, d, e, f, g, h, j, k. Bit 'a' is transmitted on the line first.

A 10 bit data frame is constructed by encoding each hexadecimal digit of the data to be transmitted according to the 4B/5B code. Bits 0 3 are encoded first, followed by bits 4 7. Thus, '23'x would be encoded as:
Bit: abcdefghjk
'23'x: 1010010101

PROTOCOL FRAMES

Protocol frames are constructed from a combination of 2 symbols, at least one of which is a control symbol. This guarantees that a protocol frame can always be distingished from a data frame.

Protocol frames that contain 2 control symbols provide added protection against noise on the line. Since control symbols differ from data symbols by at least one bit, such a frame will differ from a data frame by at least 2 bits. The availability of 5 control symbols provides for up to 25 such protocol frames.

Some frames can be constructed from one control and one retricted symbol that still meet the clocking requirement of no more than 3 consecutive zeroes. One such frame is used for the FLAG. This particular frame has been chosen because it does not occur in any phase of all possible combinations of data and control symbols. Therefore it permits the receiver to acquire and verify frame synchronisation. The FLAG frame also contains relatively few transitions to miniraise RFI when the link is idle.

Only the following 4 protocol frames are defined:
Bit: abcdefghjk
FLAG: 1000100100
ACK: 0110101101
RR: 1111111111
NUL: 1100111001

ILLEGAL FRAMES: A 10 bit frame results in 1024 possible bit patterns. Since 256 of these patterns are data frames and 4 are protocol frames, this leaves 764 patterns that are undefined. If a node receives any undefined frame while it is in the 'ready' state then it indicates an 'illegal frame' error. The illegal frame '0000000000' B is of special interest. If it occurs consistently then it indicates that the remote node is in the 'disabled state'. Therefore the receiver provides a 'no frames' indication to allow the Link ERP to detect this condition.

The transmission and receipt of a packet of data will next be described with reference to FIGS. 2, 3 and 5.

Figure 8:
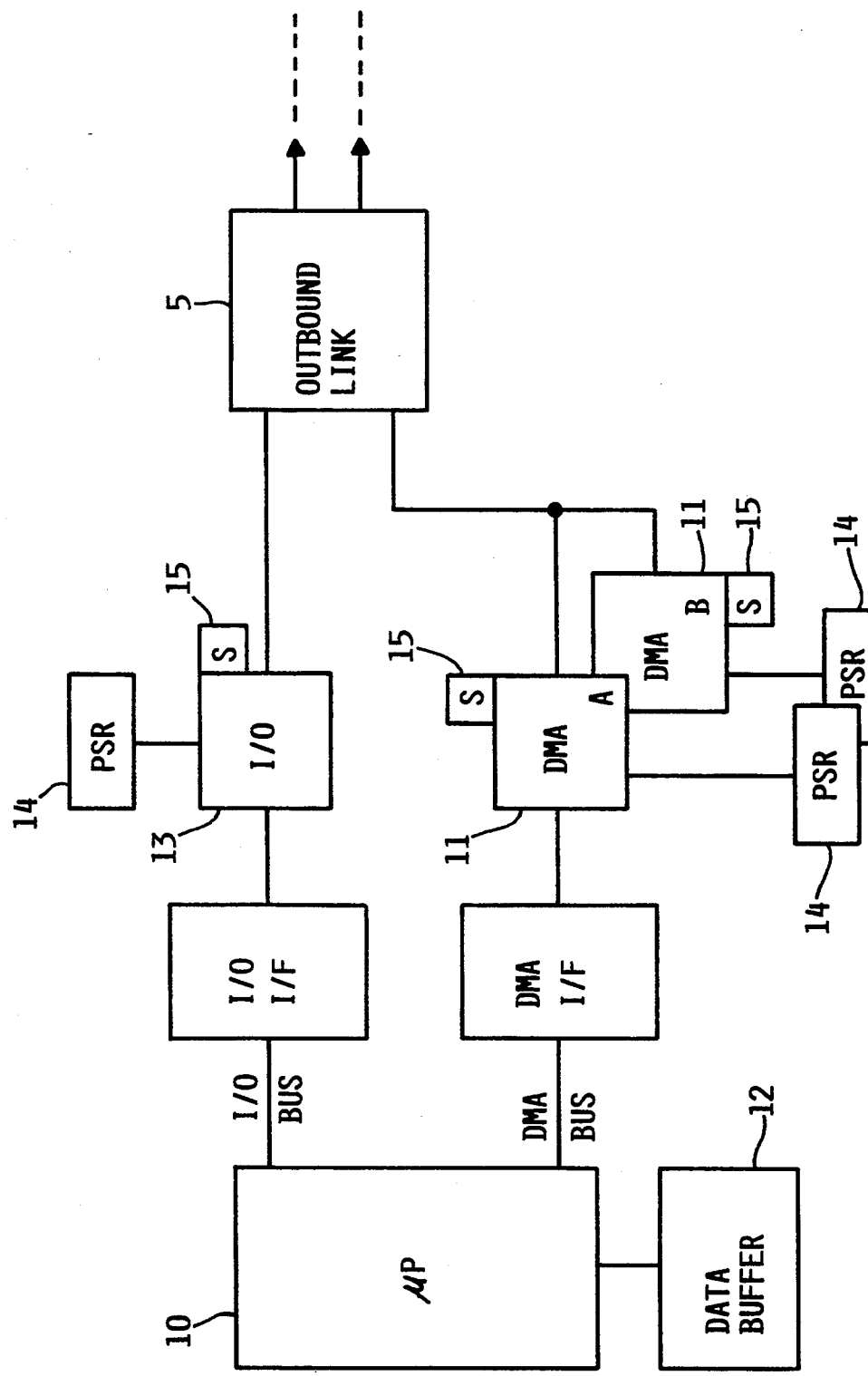
FIG. 8 shows the link hardware connected via a microprocessor to a data buffer.

FIG. 8 shows the components of one node of FIG. 1 connected via DMA and I/O buses to a microprocessor 10 which is in turn connected to a data buffer 12. The microprocessor contains the logic to address and control the data buffer. The microprocessor also includes a DMA FSM which controls the transfer of data from the Data buffer into the packet buffers of the link hardware. Details of the DMA transfer are not relevant to the present application and are therefore not described. In other systems employing the present invention other means may be provided for transferring data for transmission into the packet buffers. In the described system, all data entering and leaving the link passes through the data buffer. The packet buffers are filled by data which arrives on the links or in the described implementation by DMA which fetches data from the data buffer. The I/O Bus connecting the I/O interface to the microprocessor is used by the microprocessor to access a series of external registers implemented in the link logic. In addition the microprocessor can build message packets which are different to the data packets in that they include message information in the data field. The message packets are held in the outbound link message buffer from where they are transmitted in a similar manner to normal data packets. Message packets are used for commands, status and for initiating data transfers.

Figure 2A:
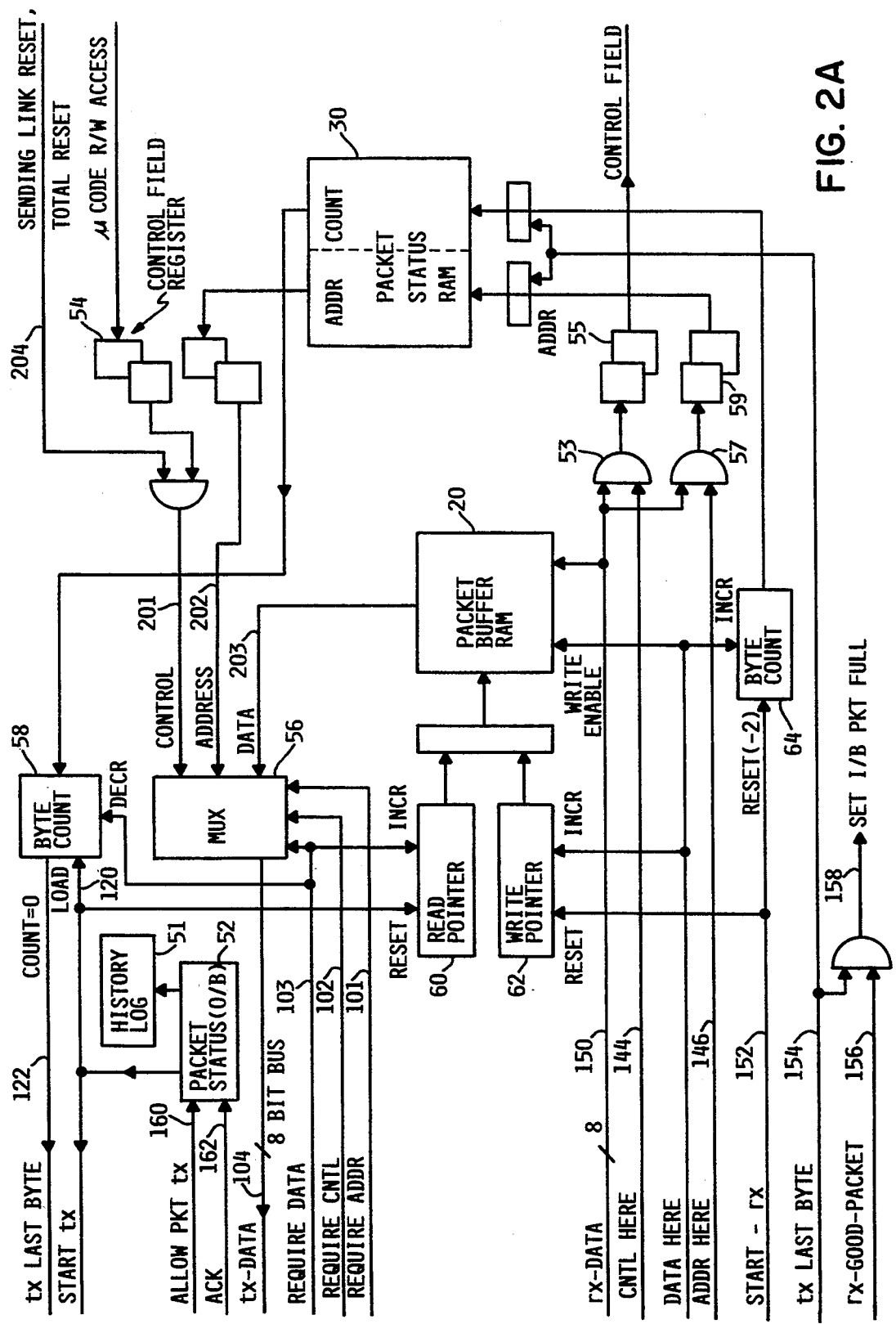
FIGS. 2a and 2b are schematic diagrams showing the components of FIG. 1 in detail.
Figure 2B:
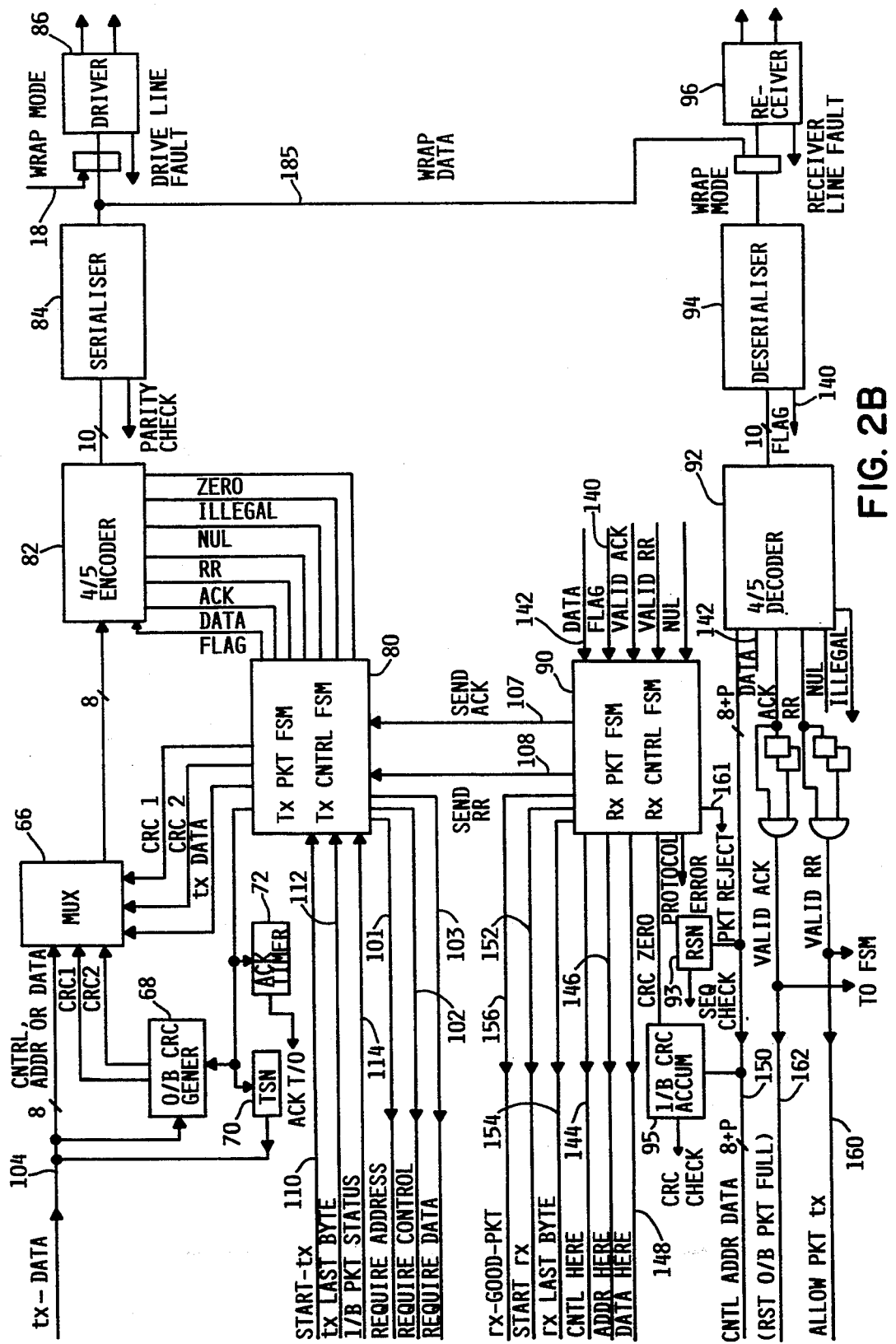

FIGS. 2a and 2b are interconnected and show the main components of the inbound and outbound links with associated packet buffer RAM 20 and packet status RAM 30. The A/B packet buffers for the inbound and outbound links are contained in the packet buffer RAM and the packet status registers associated with each of the A/B buffers are contained in the packet status RAM. The packet status registers keep a count of the number of data bytes stored in the packet buffer and contain address information. Each of the outbound and inbound packet buffers requires a corresponding packet status register (PSR). The packet status registers are 16 bits wide and each contains two fields:
(i) An 8 bit destination field: For outbound packets this contains a value which will be copied into the address field of the outgoing packet when the corresponding packet buffer contents are transmitted by the link. This value may be automatically loaded by hardware when the packet is being fetched into the packet buffer, in preparation for transmission. For inbound packets, this field contains an address extracted from the address field of the incoming packet. This value is written into the PSR by the inbound link FSM, and its value is used to determine the packet's subsequent routing.

(ii) An 8 Bit Byte Count field: For outbound packets this contains a value which indicates the number of bytes which have been placed in the corresponding packet buffer. When the link transmits the packet, this value has to be copied into a byte counter (part of the link hardware) which is decremented as each data byte is sent. The value in the PSR is preserved in case the packet has to be transmitted due to an error during link transmission. For inbound packets, this field contains a value which indicates the number of data bytes which were received in the incoming packet (excluding the two CRC bytes).

Figure 3A:
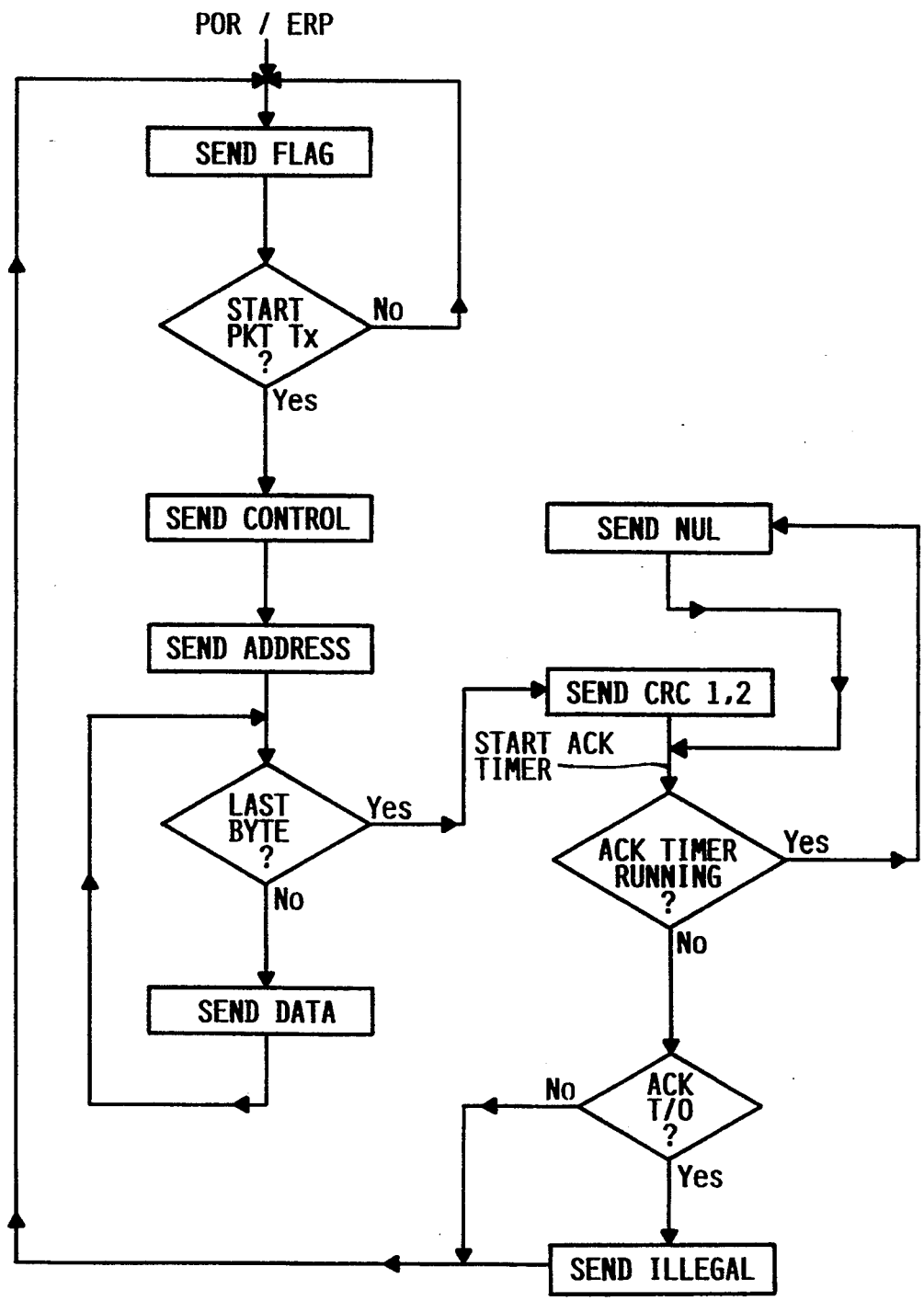
FIGS. 3a and 3b are state diagrams for the transmitter packet and control FSMs as employed in the present invention.
Figure 3B:
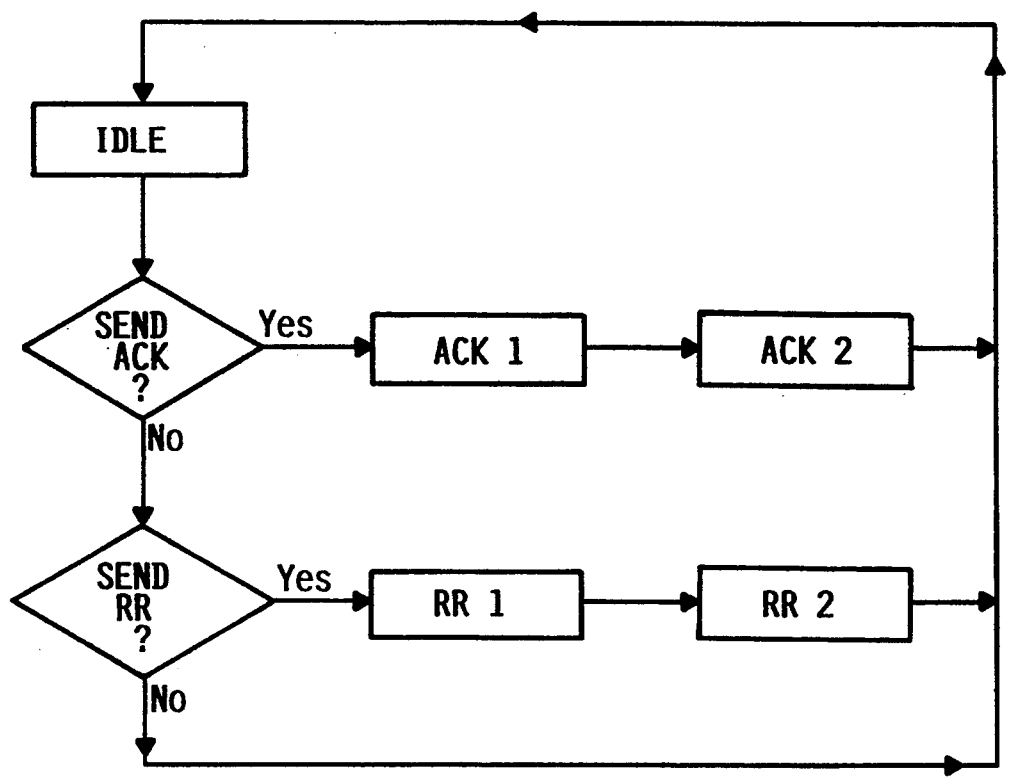

FIGS. 3a and 3b show the various states and the transitions between states of the outbound (Tx) FSMs. As described previously there are two FSMs, one being a packet FSM (FIG. 3a) which controls the transmission of packets and the other being a control FSM (FIG. 3b) which controls the transmission of ACK and RR responses. The transmission of a packet of data under the control of the Tx FSM will be described with reference to FIGS. 2a and 2b which show in block diagrammatical form the Tx FSM and connected hardware.

The outbound packet status arbitration logic 52 continuously monitors the outbound packet status bits associated with each packet buffer to determine if there is any data in the buffer which is ready to be transmitted. If so, the Tx packet FSM is notified by a pulse on line 110. At the same time arbitration logic 52 pulses line 120 which causes the byte counter 58 to load the valise stored in the 8 bit count field in the packet status register associated with the packet buffer containing the data to be sent. The byte counter therefore contains a value corresponding to the number of data bytes to be transmitted in that particular packet. During packet transmission, the counter is decremented as each byte is transferred from the data packet buffer. A pulse is put onto line 122 when the counter decrements to zero.

When the packet FSM receives the signal over line 110, it sets low the FLAG line between the Tx FSM and the encoder 82 which stops the encoder transmitting FLAG frames. The packet FSM then presents a request for control information on line 101 (FIG. 2a and b). It will be remembered that the control field of a data packet contains 8 bit. For a normal data packet (ie not link or total reset packet), the first six bits of the control field are set to 0. These 6 bits are obtained from a control field register 54, the signal on 101 causing MUX 56 to pass the six bits which are sent out on 104 connecting mux 56 with mux 66. The last two bits of the control byte which contain the packet sequence number information are obtained from TSN register 70 an added to the 6 bits from the control field register. The Transmit sequence number held in the TSN register is incremented for each packet transmitted and specifically when the packet FSM enters the 'send control state'.

When the packet FSM enters the 'send address' state, the require address line 102 is pulsed which causes mux 56 to pass the 8 bit of address information contained in the destination field of the associated packet status register. The address information is then passed onto line 104. Because of the exclusive nature of mux 56 only one of the control, address and data lines may be set at any one time and accordingly only control, address or data bytes are present on line 104 at any one time.

The packet FSM then passes from the 'send address state' and checks whether the byte counter is set to zero. If so there is no data to be transmitted in the packet data field and the FSM passes onto the 'send CRC1, 2' state. If line 122 does not indicate that byte counter is set to zero then there is data to be transmitted and the FSM enters the 'Send data state'. The require data line 103 which causes mux to pass a data byte from the packet buffer over lines 203 and 104. Each time a require data signal is sent the byte counter is decremented modulo 4.

A transmitted data packet also contains a CRC field which consists of two data frames. The CRC field is calculated in two 8 bit CRC registers in outbound CRC generator 68. Both registers are preset to all-ones at the start of each packet, more specifically when when the Tx packet FSM enters the 'send control' state. The CRC is then accumulated over the control, address and data fields by the registers in the outbound CRC generator 68. When the last byte of data contained in the packet buffer is sent (when the byte counter 58 has decremented to 0) the FSM enters the 'send CRC1, 2' state in which the two CRC registers are encoded by the encoder into 10 bit frames (CRC1 and CRC2) and transmitted. When CRC1 and CRC2 have been sent the FSM sets ACK TIMER 72 running. If a pair of ACK frames for a previous data packet have not been received by the inbound link then the FSM sets the NUL' line between the FSM and the encoder high thereby causing the encoder to send out NUL frames. When ACK frame is received before an ACK time out occurs, the transmission of NUL frames is stopped and the FSM sets the FLAG line high which causes a FLAG frame, defining the end of the packet, to be sent. The whole packet sending process is repeated if there is more data waiting to be sent, otherwise the FSM causes FLAG frames to be sent continuously.

After the control, address, data and CRC fields have been encoded, the packet passes through serialleer and is transmitted along the outbound twisted pair by driver 86.

At any time during the transmission of a data packet, it may be necessary to send out a pair of response frames either RR or ACK.

Transmission of responses has priority over the transmission of the packet so it is necessary to provide the means to interrupt data packet transmission. Sending of ACK or RR responses is controlled by the Tx control FSM which is normally in idle mode while data packets are being transmitted. When the control FSM receives a signal from the Rx FSM over line 107 or 108, the Tx packet FSM is interrupted and the control FSM started. Depending on whether the response required was an ACK or RR, the control FSM sets high the RR or ACK line between the Tx FSM and the encoder which then sends out a pair of 10 bit ACK or RR frames. When this is done, the control FSM reenters the idle state and the packet FSM resumes transmission of the part processed data packet.

Figure 4A:
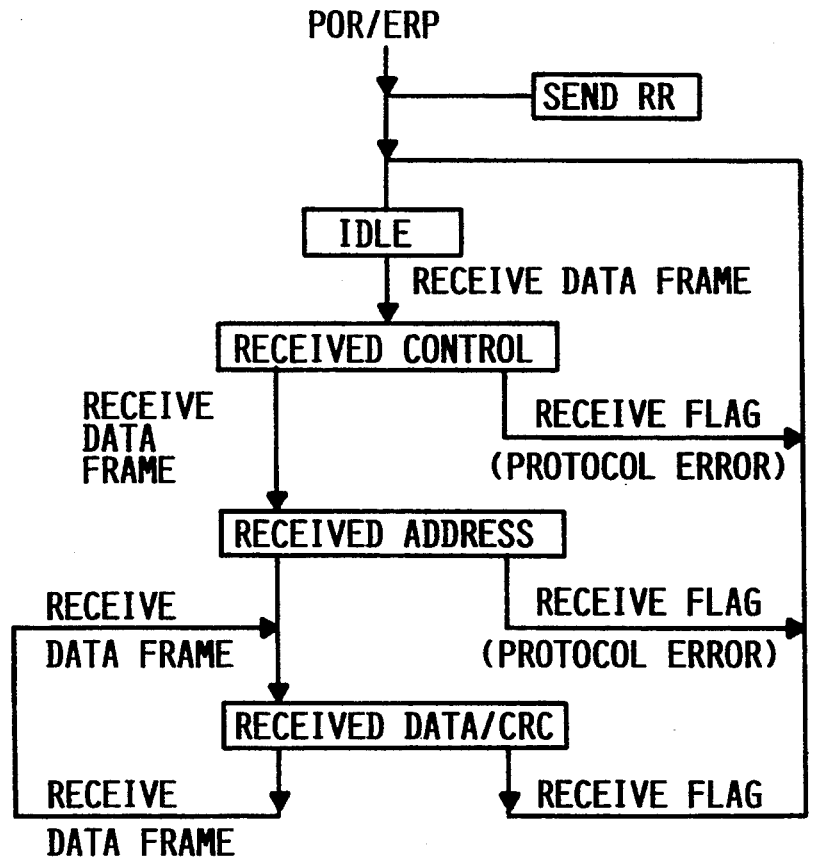
FIGS. 4a and 4b are state diagrams showing the state transitions of the receiver packet and control FSMs as used in one embodiment of the present invention.
Figure 4B:
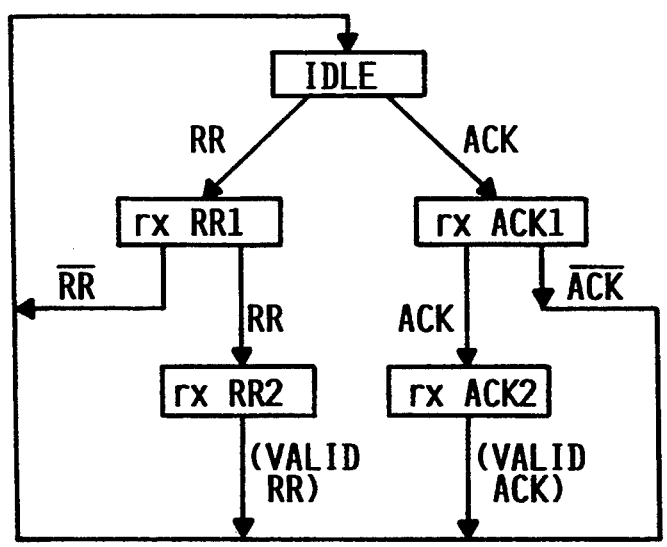

Next will be described the operation of the Rx FSMs in receiving packets of data and response frames (RR and ACK) sent by a transmitter at the other end of the serial link. FIGS. 4a and 4b show the states of the two Rx FSMs (packet and control) and FIGS. 2a and 2b show the FSMs and connected components. Referring to FIG. 4a, the Rx packet FSM is normally sitting in the idle state and receiving pulses along line 140 from deserialiser 94 indicating the receipt of FLAG frames. As noted before FLAG frames are sent continuously when no data packets are sent in order to maintain synchronisation at the receiver. The Tx packet FSM only 'wakes up' when it receives something other than a FLAG frame. When a data frame (ie control, address or data frame) is detected by the inbound 4/5 decoder 92, the data line between the decoder and the Rx packet FSM is pulsed which causes it to enter the 'received control state'. The FSM pulses line 152 which resets byte counter 64. Counter 64 is actually reset at −2, in order to compensate for the two CRC frames expected at the end of the packet. The pulse on line 152 also resets write pointer 62. CRC accumulator is also preset when the FSM enters the received cntrl frame state. The 'cntrl here' line out of the Rx FSM is pulsed. This tells the external logic that the data to be presented on 'rx_data' 8 bit bus is the control frame that has just been received. The control frame is gated by 53 and the information held in register 55 for access by the external logic. After the control frame has been received, normally a second data frame is expected. However, it can happen that the next frame received is a FLAG detected by the deserialiser. This can occur if the control frame that was supposedly received was caused by a fault on the incoming line. If a FLAG is received, the FSM indicates a protocol error. If the next frame is a data frame the data line between decoder and FSM is pulsed once again which causes the FSM to enter the 'received address' frame state. The FSM then pulses the 'addr here' line 146. This tells logic outside the link that the data on 8 bit bus 150 is an address frame. The address frame is gated by 57 and the byte making up the address frame is held temporarily in register 59. The external logic looks at the address and decides whether the address is valid. If not a pkt reject error is indicated.

After the address byte has been received, the next frame will be either a data byte or a CRC byte, depending on whether there is a data field in the packet. The FSM enters the 'received data/crc state'. At this stage data and CRC frames are indistinguishable from one another. The FSM pulses line 148 indicating the presence of a data frame. Byte counter and write pointer are incremented and the data frame is transferred into the packet buffer. As data frames are received, the packet FSM goes round the receive data frame loop, each time a frame is received the byte counter and write pointer are incremented. As each frame is received (including control and address frames) inbound CRC accumulator 95 accumulates CRC over the incoming frames. When all data frames have been received, a FLAG is detected by the deserialiser. This causes the Rx FSM to reenter the idle state until the next data packet begins to come in. When the 'received data' state of the FSM is exited on receipt of the end FLAG, the FSM pulses lines 154 indicating the last byte has been received. In addition if the packet has been received without protocol, CRC or other errors then the FSM pulses line 156. If no errors have been detected and the CRC checksum is correct, then the Rx FSM pulses line 107 which freezes the Tx packet FSM if in the middle of transmitting a packet and causes the Tx control FSM to send out a pair of ACK frames as described above. The RSN in register is also incremented. When 154 and 156 are pulsed, the count stored in byte counter 64 is copied into the packet status register associated with the packet buffer into which the data has been written. The address held in register 59 is also copied in the destination field of the status register. After the address and count fields of the register have been written the i/b packet full bit is set by a pulse on line 158 which indicates to the external logic (ie the logic that uses the data that has been received) that a packet has been correctly received and is ready for access. If during receipt of a packet, an illegal frame is detected by the decoder, the portion of the packet received up to that point is discarded.

As described previously during full duplex operation of the link a response frame (RR or ACK) may be interleaved within a data packet. Accordingly when a packet is being received as described above, the decoder may detect a pair of ACK or RR frames. The Rx control FSM which is normally idling is started. When a RR frame is detected, the control FSM enters the 'rx RR1' state. If a second RR frame is detected (as should be the case) the FSM enters the 'Rx RR2' state. The FSM then indicates that a valid RR response has been received and this causes line 160 to be pulsed thereby indicating to the packet arbitration logic 52 that the remote node is ready to receive more data. The arbitration logic knows if there is data in the buffer to be transmitted and if so it begins packet transmission as described above. If the Rx control FSM receives a pair of ACK frames, then it causes line 162 to be pulsed. The arbitration logic indicates to the history log that a valid ACK response has been received. The history log knows what packets are outstanding that require acknowledgment. The Tx packet buffer containing the acknowledged packet can then be cleared ready for more data.

ERROR RECOVERY PROCEDURE (ERP)

The architecture of the serial link defines the method to recover TRANSMISSION errors at the packet level. Recovery is performed by a self-contained Link ERP using the existing transmit packet buffers. This has the following benefits:

The application software is simplified since recovery is transparent.

There is no need to terminate any operations when an error occurs.

There is no uncertainty about the state of the remote node.

The compatibility of different implementations is enhanced.

Note that HARDWARE ERRORS, such as parity checks, may not be recoverable at the packet level. Data may have been lost or unknown state changes may have occurred. In this case the application must still perform the recovery. The operations in progress are terminated and repeated by a higher level in the using system. This is an acceptable solution since hardware errors are much less frequent than transmission errors.

The basic principles of the method of error recovery are as follows:

1. In normal operation (as described in detail above) the transmitter does not reuse a packet buffer until it has received an ACK response. This indicates that the packet has been received correctly by the destination node. Therefore when an error occurs the affected packet(s) are still available for retransmission (because a node can begin sending a second packet before receiving the acknowledgment for the first there may be at most two packets that require retransmission).
2. When an error is detected both nodes enter the 'check' state, invoke the Link ERP and exchange status by means of Link Resets.
3. Recovery is performed separately for each line. Each node is responsible for recovering packets that were lost on its out-bound line. Because the transmitter is allowed to start sending another packet before it receives an ACK response, up to 2 packets may need to be retransmitted.
4. Before restarting communication the Link ERP forces the hardware into the 'disabled' state so that both nodes are in compatible states.
5. The link protocol and ERP are designed to minimise the chances of losing or duplicating any packets when an error occurs. However the application should protect itself against these events wherever possible. For example, the byte count can be checked for zero at the end of a data transfer and time-outs con be used to detect lost message packets.

LINK ERRORS

Except where explicitly stated the following errors are only indicated when the link hardware is in the 'ready' state prior to the error. In all cases the hardware will enter the 'check' state and interrupt the node processor. Except for resets no further packets are accepted or acknowledged until the hardware returns to the 'ready' state. Errors are generally ignored if the hardware is not in the 'ready' state.

ACK TIME-OUT: this is indicated when the source does not receive an ACK response within the specified time of sending the trailing FLAG of a packet other than a Total Reset. The affected packet remains in the transmit buffer for possible retransmission by the Link ERP.

ILLEGAL FRAME: this error is indicated if the receiver decodes a frame which is not one of the 4 protocol frames or one of the 256 data frames.

PROTOCOL ERROR: this error is indicated when a node receives an invalid or unexpected sequence of frames as listed here:
1. A short packet with less than 4 data frames between 2 FLAG's. This may be caused by noise corrupting or manufacturing a FLAG.
2. A node receives a control field that does not specify a reset and no buffer is available, ie. when 'RR pending' is set.
3. An unexpected ACK response, ie. when 'waiting for ACK' is reset.
4. An isolated ACK frame. If an ACK response is corrupted the transmitter will also detect an ACK time-out.
5. An isolated RR frame.
6. A NUL frame with no intervening data frame since the last FLAG.

One half of the link will hang if an RR response is lost without any errors being detected, eg. if the RR's are changed to FLAG's while the link is idle. This is extremely unlikely and therefore no recovery is provided at the link level. Instead the application should provide a time-out for the operation in progress.

CRC ERROR: this error is indicated when a received packet has bad CRC and none of the errors above occurred.

SEQUENCE ERROR: this error is indicated when a received packet has PSN not equal to RSN, none of the errors above occurred and the packet does not specify a reset. A previous packet has probably been lost.

PACKET REJECT: this error is indicated when a packet is received correctly with none of the errors above but the packet is unacceptable for any of the following reasons:
1. The packet is too long to fit in the available buffers. Note that the receiver must continue to accumulate the CRC after the buffer has overflowed in order to verify that there hasn't been a transmission error, eg. a corrupted FLAG.
2. The packet length is otherwise unacceptable to the implementation, eg. odd when it must be even.
3. The user-defined bits in the control field are not acceptable to the implementation.
4. The address field specifies a destination that is currently invalid or not implemented and the control field does not specify a reset.

Errors in this class are due to programming, synchronisation or compatibility problems. The Link ERP does not retry them. Instead the application will be alerted via an ERP exit so that it can retry or terminate the operations in progress.

LINE FAULT: this error is indicated when the line driver or line receiver detects an invalid voltage and the link hardware is not in the 'disabled' state. The cable may be open or short circuit or the remote node may be powered off.

HARDWARE ERROR: this error is indicated when a node detects an internal hardware error, eg. a parity check, The Link ERP will not retry errors in this class. Instead the application will be alerted via an ERP exit so that it can retry or terminate the operations in progress.

LINK STATUS BYTE

During error recovery the Link ERP in each node builds a Link Status Byte and sends it to the other node in the address field of a Link Reset packet. FIG. 9 shows the format of the link status byte.

| | |
|---|---|
| H/W ERROR | When '1', this bit indicates that the node detected an internal hardware error. |
| LINE FAULT | When '1', this bit indicates that the node detected a line fault on either the in-bound or the out-bound pair. It is provided for information only and it is not referenced by the Link ERP in the destination node. |
| ACK T/O | When '1', this bit indicates that the transmitter timed-out while waiting for an ACK response. It is provided for information only and it is not referenced by the Link ERP in the destination node. |
| RECEIVER ERRORS | This field contains a 3-bit code to identify the first error detected by the receiver:<br>000 No error<br>001 Illegal frame<br>010 Protocol error<br>011 CRC error<br>100 Sequence error<br>101 Packet reject |

When two or more errors occur simultaneously the lowest number is reported.

| | |
|---|---|
| RSN | This is the receive sequence number for the last packet that was acknowledged by the node, excluding Link Resets. It is needed by the Link ERP in the remote node. |

How the link status byte is compiled when an error is detected is described in detail below.

Error recovery is symmetrical for both nodes. When an error occurs both nodes will enter the 'check' state and invoke the Link ERP. It is expected that the Link ERP will normally be implemented in software running on the node processor. However the functions could conceivably be performed by a hardware FSM if performance is critical.

If the ERP determines that a transmission error occurred then it attempts to recover the error itself. If recovery is successful the Link ERP terminates and the application continues unaware of the error.

The ERP cannot recover some errors transparently, eg. hardware errors or permanent line faults. In these cases the ERP exits to the application, which should then perform a reset and abort the operations in progress. The ERP is carefully designed so that both nodes always recognise an unrecoverable error and remain synchronised.

Note that the time intervals included in this description are for illustrative purposes only, in practice they are dependent on the application and implementation.

The first (or only) node that detects the error enters the 'check' state and invokes its Link ERP, The Link ERP functions as follows:

1. The ERP waits until the transmitter has finished sending the current packet, if any.
2. The ERP then builds the Link Status Byte by reference to the hardware.
3. If the line driver or receiver have detected a line fault then the ERP tries to reset the error. If this fails then the application is alerted via an ERP exit ('Permanent line fault').
4. The ERP checks whether the receiver bas indicated a 'no frames' error. If so, the remote node may have powered off or it may have entered the 'disabled' state. The application is alerted via an ERP exit ('Remote node disabled').
5. The ERP saves the local TSN which is held in TSN register 70 for use later.
6. The ERP instructs the transmitter to send a Link Reset packet containing the local Link Status Byte to the remote node. The remote node should now enter the 'check' state, if it has not already done so. Either way it will invoke its Link ERP and return a Link Reset containing the remote Link Status Byte.
7. The ERP waits to receive an acknowledgement to the Link Reset that it sent. It also waits to receive a Link Reset from the remote node. If an ACK time-out occurs, or no Link Reset has been received after 1 ms, then the ERP sends another Link Reset. If an ACK time-out occurs, or no Link Reset has been received after a further 1 ms, then the application is alerted via an ERP exit ('Link Reset failed').
8. The implementation must protect against the ERP looping if there is a permanent error. Since both nodes are always involved in error recovery it is sufficient if only one node provides this protection, eg, the upper node in a hierarchical system. The following is an example of one method that can be used. Each invocation of the ERP increments a retry counter that is reset to zero periodically by a timer. If the number of retries in one period of the timer exceeds some maximum value then the ERP waits 10 ms to ensure the remote node recognises that retry is being aborted. The application is then alerted via an ERP exit ('Retry limit exceeded'). This scheme also protects against excessive use of the ERP in the event of severe external noise.
9. If either node has detected a hardware error then the application is alerted via an ERP exit ('Hardware error'). The ERP exit also indicates the node that detected the error. (Local node, remote node or both.)
10. If either node has indicated 'packet reject' then further communication may be meaningless. The application is alerted via an ERP exit ('Packet rejected'). The ERP exit also indicates the node that detected the error. (Local node, remote node or both.)
11. Otherwise the ERP calculates the number of packets that have been sent but not acknowledged, $$Q = (\text{Transmit\_pointer} - \text{Retry\_pointer}) \text{ modulo } N$$

where N is the number of transmit buffers that are provided. Q should be 0 or 1 packets. The ERP also calculates the number of packets that have been transmitted but not received, $$P = (\text{Saved\_local\_TSN} - \text{Remote\_RSN}) \text{ modulo } 4$$

P should be less than or equal to Q.

If either of these checks fails the ERP waits 10 ms to ensure that the remote node recognises an unrecoverable error. The application is then alerted via an ERP exit ('Invalid retry status').

12. Otherwise the ERP arranges to resend the lost packets by subtracting P from its transmit pointer, modulo N.
13. Those out-bound buffers that do not need to be retransmitted must now be discarded using the following algorithm:

$$\text{Do while Retry\_pointer} \neq \text{Transmit\_pointer};$$

Deallocate buffer at Retry_pointer; Increment Retry_pointer modulo N; End;

14. If the node has received a packet containing any of the 'receiver errors' in the Link Status Byte then it must be discarded. The appropriate in-bound buffer may be deallocated automatically by the receiver hardware or the ERP may have to do it explicitly. Otherwise the ERP does not need to deal with the in-bound buffers. If any are full they will be emptied by the application.
15. The ERP disables the link and resets all of the latches for hardware errors, ACK time-out and receiver errors.
16. The ERP waits until the remote node enters the 'disabled' state, as indicated by the 'no frames' signal from the receiver. This is required to synchronise the two Link ERP's and prevent the transmitter sending an RR response while the remote node is still in the 'check' state.

If the receiver does not indicate 'no frames' within 1 ms the application is alerted via an ERP exit ('Time-out waiting for disabled state'). The remote node may have detected an unrecoverable link error.

17. Otherwise the ERP enables the link.
18. The ERP waits for the link to become 'ready'. This indicates that the remote node has completed its recovery. In a hierarchical system the lower node may wait indefinitely for the 'ready' state. Alternatively a time-out can be provided as follows. If the link does not become 'ready' within 1 ms the application is alerted via an ERP exit ('Time-out waiting for ready state'). This may indicate that the remote node has powered off or encountered a Type 1 error.
19. Otherwise the ERP terminates successfully.

After each node becomes 'ready' it will send an RR response to the other when it has at least 1 in-bound buffer available. This will reset 'waiting for RR' and allow transmission of any pending packets.

FIG. 7 illustrates one example of the operation of the I, ink ERP. The local node sends 2 packets back-to-back. The remote node receives them correctly but the ACK response for the first packet is corrupted. The local node then detects an illegal frame. No packets need to be retransmitted since only the ACK response was lost. To illustrate the operation of the transmit pointer (TP) and the retry pointer (RP) it is assumed that the local node has 4 transmit buffers. The remote node has 2 receive buffers. P and Q values are those calculated according to the equations given earlier.

The detection of errors and the resultant compilation and transmission of a link reset packet including link status byte will now be described in greater detail with reference to FIGS. 2a and 2b.

When an error is detected by the outbound link during packet transmission or by the inbound link during packet reception, an error line is pulsed (e.g. line 141 exiting the receiver indicating a receiver line fault or line 161 exiting the Rx FSM indicating a pkt reject error). The pulse causes the appropriate bit in one of two registers associated with the link hardware to be set. These two registers are the Link Error Register and Link H/W error register. The Link error register is an 8 bit register which is used to indicate most of the detectable errors i.e. illegal frame, protocol error, CRC error, packet reject, ACK time out, no frames and line fault. The Link hardware error register indicates the type of hardware error detected. A third register shown in FIG. 9 is the Link Status Register. Two bits of this register indicate the value of the transmit sequence number (TSN) which is maintained in the TSN register 70 of the outbound link. The value is incremented for every packet sent. The value of the TSN is used during error recovery (as described above) in the process of calculating how many packets need to be retransmitted. A further two bits of the Link status register indicate the value of the receive sequence number (RSN) which is maintained by the RSN register 93 of the inbound link. This value is incremented for every packet received (ie for every ACK response sent). This value is frozen when the link enters the check state when an error is detected.

The Link ERP invoked on detection of an error compiles the link status byte with reference to these three registers. The link ERP is controlled by the microprocessor of FIG. 8. Each of the bits of the Link Status Byte is copied from one of the three above described registers. A receiver error (illegal frame, protocol error, sequence error, crc error or packet reject error is indicated in the link status byte by the three bit code described above.

The link status byte so compiled is loaded by the microprocessor into the destination field of the packet status register associated with the outbound link message buffer. The count field of the PSR is set at zero. Line 204 in FIG. 2a is pulsed to indicate that a reset packet is ready to be sent. The link reset packet is then transmitted by the outbound link hardware in substantially the same way as a data packet, as is described in detail above. However, the control frame requested by the Tx packet FSM is obtained from line 204 and has the appropriate bit set to indicate either a link reset or a total reset. The address field is obtained in the normal way from the destination field of the packet status register which in the case of link resets contains the compiled link status byte. There are no bytes of data in the message buffer so the Tx FSM completes the packet with the two CRC bytes and trailing end flag. Thus using the method described above, little extra logic in the link hardware is required in order to transmit the link reset packet which is transmitted in the same way as a normal data packet.

When the link reset packet is correctly received by the inbound link of the remote node, it is acknowledged in the same way as a normal packet. The address field comprising the link status byte is loaded into the packet status register of the inbound packet buffer ready for access by the link ERP. The control field indicating that the packet is a reset packet is held in latch 59 where it is accessed by external logic. When the reset packet has been received, the Link ERP in the remote node is invoked which causes a link status byte to be compiled and transmitted in the same way as already described.

Each node then looks at the error information contained in the link reset packet that it receives. The way the node acts in response to each type of error depends on the system connected to the node. As described previously if a hardware error or packet reject error is detected the ERP does not attempt to recover the error by retransmission of packets. Instead it alerts the application by means of an ERP exit. Otherwise the ERP calculates the number of packets that have been sent but not acknowledged. The History log 51 contains this information. The ERP also calculates the number of packets that have been transmitted but not received. This value is obtained by subtracting the RSN value contained in the link status byte from the TSN value in the local node which was frozen when the node entered the link check state. The node thus knows how many packets need to be retransmitted. As described previously, the node discards those packets which were received by the remote node.

We claim:

1. A data communication system including
   two nodes connected by a serial link over which data is transferred between the nodes in packets of a predefined format,
   error detection means in each node for detecting errors,
   and transmission error recovery means in at least one of said nodes responsive to detection of an error by the error detection means of that node to cause that node to send an error message to the other node including a sequence number indicative of the last packet received by said at least one node, and to receipt of an error message from the other node to cause said at least one node to send its error message to the other node,
   each node being arranged to determine from the error message from the other node the number of packets, if any, that were not correctly received by the other node and to retransmit the missing packets.

2. A system as claimed in claim 1 in which each node includes multiple packet buffers for storing packets to be transmitted over the link or received on the link.

3. A data communication system including
   two nodes connected by a serial link over which data is transferred between the nodes in packets of a predefined format,
   error detection means in each node for detecting errors,
   and transmission error recovery means in at least one of said nodes responsive either to detection of an error by the error detection means of that node to cause that node to send an error message to the other node including a sequence number indicative of the last packet received by said at least one node, or to receipt of an error message from the other node to cause said at least one node to send its error message to the other node, each node being arranged to determine from the error message from the other node the number of packets, if any, that were not correctly received by the other node and to retransmit the missing packets, each node includes multiple packet buffers for storing packets to be transmitted over the link or received on the link, and each node including
means for transmitting an acknowledgement message to the other node upon receipt of a packet,
transmit pointer means for indicating from which packet buffer the last packet was transmitted, and
acknowledgement pointer means for indicating from which packet buffer the last packet to have been acknowledged was transmitted.

4. A system as claimed in claim 3 including means for calculating from the transmit pointer means, the number of packets sent which have not been acknowledged, and means for comparing this number with the number of packets to be retransmitted, thereby to identify packet buffers containing packets not required to be retransmitted.

5. An error recovery method for use in a data communication system, said data communication system comprising two nodes connected by a serial link, data being transferred between the nodes in packets of a predefined format, said method comprising the steps of:

monitoring the system for errors with each node;

sending a first message with a first node to a second node, in response to detecting an error by said first node, said first message including a sequence number indicative of the last packet received by said first node;

receiving said first message with said second node;

sending a second message with said second node to said first node, in response to said step of receiving said first message, said second message including a sequence number indicative of the last packet received by said second node;

receiving said second message with said first node;

determining with each node, from the respective one of said first and second messages received from the other node, the number of packets, if any, that were not correctly received by the other node; and retransmitting a packet if said determining step determines that the packet was not correctly received.

6. The method of claim 5, further comprising the steps of:

sending an acknowledgement with each node to the other node upon receipt of a packet;

calculating, with each node, the number of packets it has sent which have not been acknowledged; and comparing, with each node, the number produced by said calculating step with the number of packets to be retransmitted, and discarding surplus packets when the number of packets to be retransmitted is greater than the number produced by said calculating step.

7. The method of claim 6, wherein each said packet comprises a plurality of predefined fields, each field consisting of one or more multibit data frames, and wherein the flow of data packets is controlled by means of multiple bit control frames distinguishable from the data frames, the control frames being transmissible independently of the data packets.

8. The method of claim 7, wherein the acknowledgment is one of the control frames.

9. The method of claim 5, wherein said step of retransmitting a packet is not attempted upon the detection of certain predetermined errors.

10. The method of claim 5, wherein each said packet comprises a plurality of predefined fields, each field consisting of one or more multibit data frames, and wherein the flow of data packets is controlled by means of multiple bit control frames distinguishable from the data frames, the control frames being transmissible independently of the data packets.

* * * * *